(12) United States Patent
Desai et al.

(10) Patent No.: US 7,173,520 B2
(45) Date of Patent: Feb. 6, 2007

(54) SYSTEM AND METHOD FOR IDENTIFYING SOURCE OF RF TRANSMISSION

(75) Inventors: Tejas B. Desai, Sterling Heights, MI (US); Gerald L. Ostrander, Davison, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 637 days.

(21) Appl. No.: 10/395,868

(22) Filed: Mar. 24, 2003

(65) Prior Publication Data

US 2004/0036591 A1 Feb. 26, 2004

Related U.S. Application Data

(60) Provisional application No. 60/367,023, filed on Mar. 22, 2002.

(51) Int. Cl.
*B60C 23/00* (2006.01)
*B60C 23/02* (2006.01)
(52) U.S. Cl. ........................................ 340/442; 340/445
(58) Field of Classification Search ........... 340/870.07, 340/442–447, 426.13–426.15, 426.17, 870.11; 73/146.3–146.5, 146.2
See application file for complete search history.

(56) References Cited

U.S. PATENT DOCUMENTS 5,741,966 A * 4/1998 Handfield et al. ......... 73/146.5

6,246,317 B1 * 6/2001 Pickornik et al. ........... 340/447
2005/0024192 A1 * 2/2005 Desai ......................... 340/445

FOREIGN PATENT DOCUMENTS

EP 1026015 A2 8/2000
GB 2316209 A * 2/1998

* cited by examiner

*Primary Examiner*—Timothy Edwards, Jr.

(57) ABSTRACT

To eliminate any mis-learning of a sensor code in a factory environment due to adjacent vehicles, a vehicle ID is sent to a sensor transmitter by an initiation signal. When the sensor transmitter transmits its sensor identification signal to the vehicle control in a "learn" mode, the vehicle ID received in the initiation signal is carried with a combined signal. The vehicle control receives the combined signal, and if the received vehicle identification code in the signal matches an expected vehicle identification code, then the control learns the sensor identification. If the expected vehicle identification code does not match the received vehicle identification code, then the control may ignore the particular sensor identification code. This invention thus eliminates any tendency to have an adjacent vehicle inadvertently "teach" its sensor IDs to the control associated with the adjacent vehicle.

11 Claims, 2 Drawing Sheets

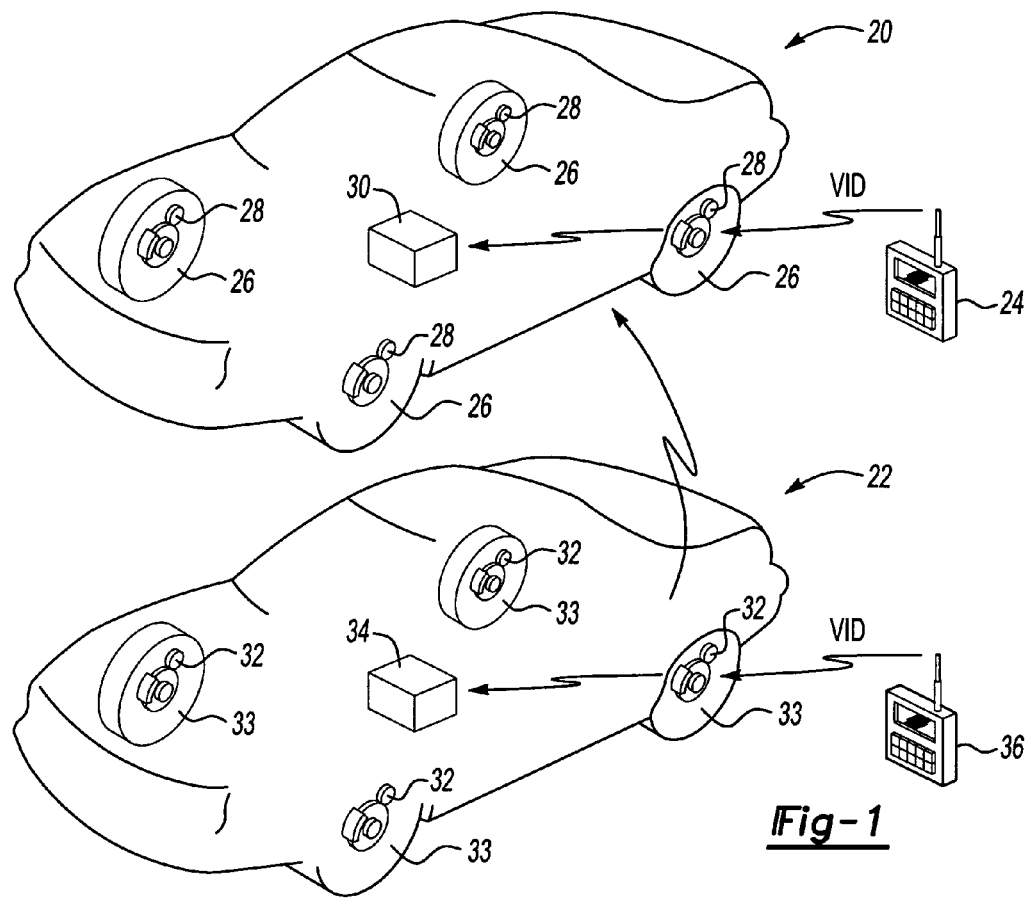
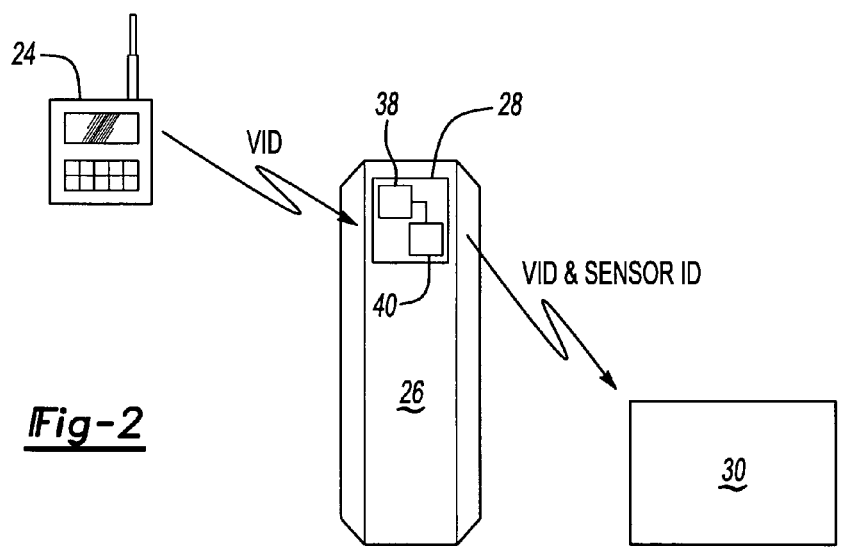

SYSTEM AND METHOD FOR IDENTIFYING SOURCE OF RF TRANSMISSION

The present invention claims priority to U.S. Provisional Patent Application Ser. No. 60/367,023 filed on Mar. 22, 2002.

BACKGROUND OF THE INVENTION

This invention relates to sending a vehicle ID to an RF transmitter associated with a sensor on a vehicle, and in particular a tire pressure sensor, such that the vehicle ID and a transmitter ID are sent to a monitoring control for the sensor to identify the vehicle on which the sensor is mounted.

Modern vehicles are being provided with more and more sensors. In particular, modern vehicles must now be equipped with tire pressure monitors. In the most popular configuration, each of the tires on a vehicle is provided with a tire pressure sensor that periodically sends a signal to a vehicle control.

Each tire pressure sensor has an associated identification code, such that the signal can be received by the control, and associated with a particular vehicle tire. Thus, this control must be able to "learn" the identification code for each of the sensors associated with the vehicle to which the control is assigned.

To perform this learning function, it is common to initiate the sensors to send a signal to the control while the vehicle is still in a factory environment. In one known method of learning, an initiator is brought adjacent to each of the tires on a vehicle. The initiator sends a signal that is received by the sensor on the tire. The sensor then generates its own signal which includes the sensor identification code, and which is transmitted to the vehicle control. Typically, the signals from the sensors being sent to the control are RF signals, which potentially have a relatively long range.

Often, many vehicles are having their transmitter identifications "learned" at any one time. Thus, a problem could arise in which an adjacent vehicles carries a tire pressure sensor which is sending its signal, and which is captured and "learned" by a control on an adjacent vehicle.

It would be desirable to eliminate this potential misidentification of a sensor.

SUMMARY OF THE INVENTION

In a disclosed embodiment of this invention, the initiator generates a signal. In particular, the initiator may be an LF transmitter. The LF signal is sent from the initiator to the sensor associated with the vehicle tire. The sensor receives this LF signal, and then generates an RF signal from the transmitter associated with the sensor. This aspect of the invention is as known and as exists in the prior art today. However, what is new is that the LF signal sent from the initiator to the sensor carries a vehicle ID signal. The vehicle ID signal is sent with this LF generated vehicle ID as a combined signal from the transmitter on the tire pressure sensor. Thus, the signal sent from the tire pressure sensor includes the vehicle identification, along with the sensor identification.

The control receives this RF signal, and compares the vehicle identification to an expected vehicle identification for the particular vehicle. If the two match, then the sensor ID is "learned." If, however, the vehicle identification code is distinct from that expected by the control, then the sensor ID will be ignored.

In this fashion, the present invention provides a very simple method for eliminating any misidentification of a sensor ID between adjacent vehicles when the sensor IDs are being initially learned.

These and other features of this invention can be best understood from the following specification and drawings, the following of which is a brief description.

BRIEF DESCRIPTION OF THE DRAWINGS

FIG. 1 is a schematic view of a factory environment.

FIG. 2 is a schematic view of a portion of the inventive method and system.

DETAILED DESCRIPTION OF THE PREFERRED EMBODIMENT

Figure 3:
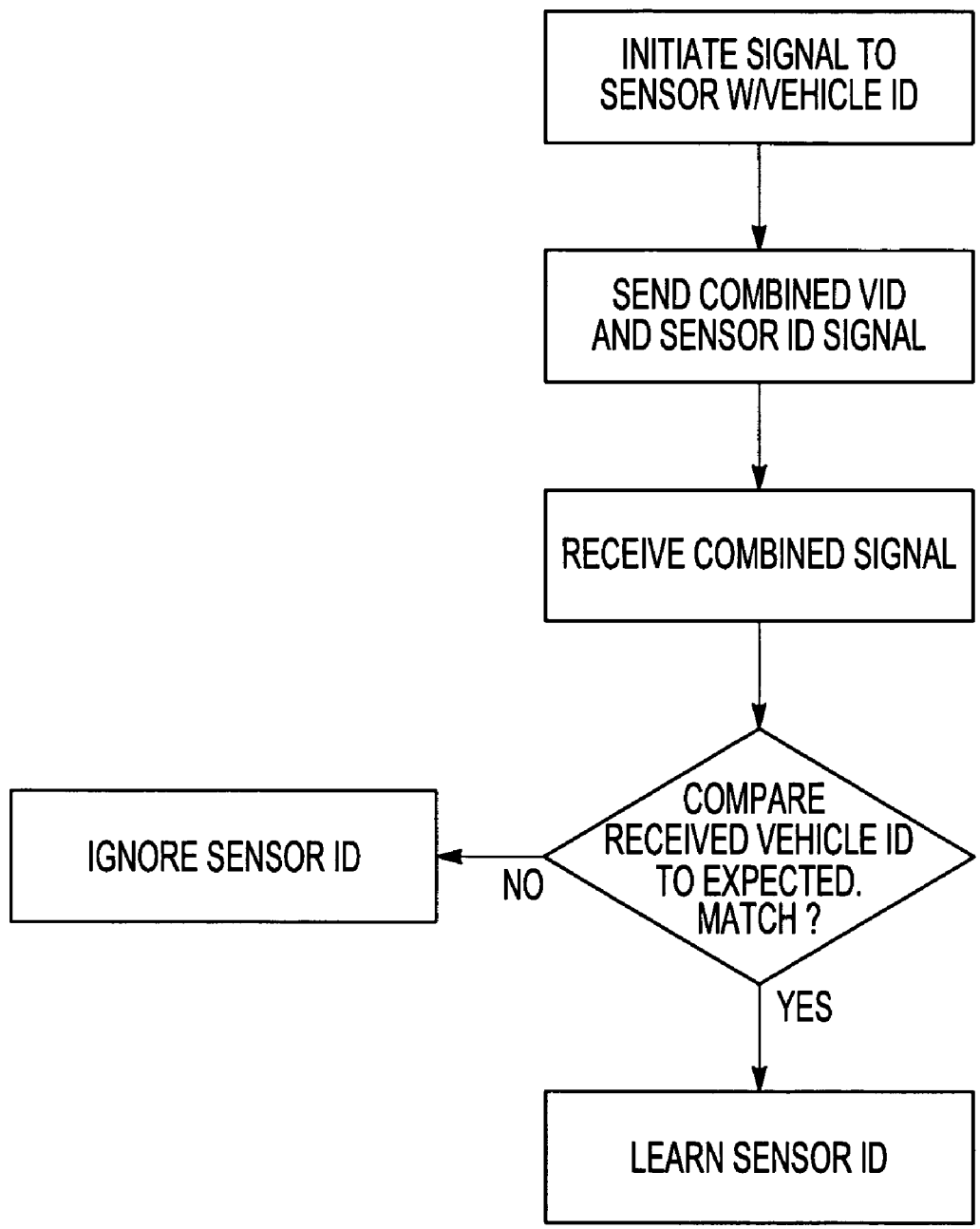
FIG. 3 is a simple flowchart of a method of the present invention.

A pair of adjacent vehicles 20 and 22 are shown in a factory setting nearing the end of assembly of the vehicles. As shown, a handheld initiator 24 is brought adjacent to each of the plurality of tires 26 on the vehicle 20. The handheld initiator 24 sends a signal, which is preferably an LF signal, and which is received by a tire pressure monitoring sensor 28 associated with each vehicle tire 26. The sensors 28 then transmit an RF signal to a vehicle control 30. This RF signal has typically included a sensor ID that is captured and then learned by the control 30.

One problem with the prior art can be best understood from FIG. 1. At the same time the initiator 24 is teaching control 30 its tire pressure codes, a second initiator 36 may be utilized to learn the codes from the tire pressure sensors 32 on the tires 33 associated with the vehicle 22. Thus, the same request from the initiator 36 is being received by the sensors 32, and similar RF signals are being sent to be captured by the control 34. A problem exists in that the RF signal from the sensors 32 potentially could reach the control 30. The control 30 may thus then "learn" a sensor ID that is actually associated with one of the sensors 32 on the adjacent vehicle, which would be undesirable.

The present invention addresses this concern by including a vehicle ID into the signal sent from the initiator. The vehicle ID is one expected by the control 30. Thus, the initiator 24 is somehow programmed to know the particular vehicle ID for the particular vehicle 20 or 22. The vehicle ID may be simply captured at the initiators from the control 30 in some fashion, or may be entered into the initiators 24 and 36 as appropriate. Notably, the vehicle ID need not be the VIN for the vehicle. Also, the vehicle ID for purposes of this application, may actually simply be an identification code for the initiator.

However, and as best understood from FIG. 2, once the initiator 24 sends its vehicle ID to the sensor 28, it is received at an LF receiver 38. The LF receiver 38 is connected via appropriate circuitry to an RF transmitter 40. The RF transmitter 40 would then send a combined signal, including the vehicle ID plus the sensor ID for the particular sensor 28. This combined signal is received by the control 30. The control 30 then compares the received vehicle ID to its expected vehicle ID. If the two match, then the control 30 learns this particular sensor ID. If the vehicle ID received from the sensor 28 does not match that which is expected at the control 30, then the sensor ID will be ignored.

The present invention thus provides a very simplified method of eliminating any potential mis-learning from an adjacent vehicle.

Although a preferred embodiment of this invention has been disclosed, a worker of ordinary skill in the art would recognize that certain modifications would come within the scope of this invention. For that reason, the following claims should be studied to determine the true scope and content of this invention.

What is claimed is:

1. A method for learning sensor codes at a vehicle control comprising the steps of:
   (1) providing a vehicle with a control and a plurality of tire pressure sensors each having an individual sensor ID, said control also having an expected vehicle ID;
   (2) initiating the transmission of a signal from each of said plurality of tire pressure sensors by sending a signal to each of said plurality of tire pressure sensors, said signal being sent to each of said plurality of tire pressure sensors including a vehicle ID; and
   (3) transmitting a combined signal from each of said plurality of vehicle sensors to said control, said combined signal including both said vehicle ID, and said sensor ID, and capturing said combined signal at said vehicle control, and comparing said expected vehicle ID to a received vehicle ID, and learning said sensor ID if said expected vehicle ID and said received vehicle ID match.

2. A method as set forth in claim 1, wherein a handheld initiator is utilized to initiate transmission of said signal from said plurality of vehicle sensors.

3. A method as set forth in claim 2, wherein said handheld initiator sends an LF signal.

4. A method as set forth in claim 3, wherein said plurality of tire pressure sensors send an RF signal to be captured by said control.

5. A method as set forth in claim 1, wherein said plurality of tire pressure sensors are tire pressure monitoring sensors each associated with individual tires on said vehicle.

6. A tire pressure monitoring sensor comprising:
   a tire pressure sensor, said tire pressure sensor including a receiver and an RF transmitter, said tire pressure sensor incorporating a sensor identification code which can be transmitted by said RF transmitter; and
   said receiver receiving a signal from a handheld initiator to generate transmission of a signal by said RF transmitter to a vehicle control, said signal transmitted by said RF transmitter when initiated by said receiver incorporating a vehicle identification code received by said receiver, such that the signal sent by said RF transmitter includes said vehicle identification code and said sensor identification code.

7. A system for monitoring tire pressure on a vehicle comprising:
   a plurality of tire pressure sensors, said tire pressure sensors including an LF receiver and an RF transmitter, said tire pressure sensors incorporating a sensor identification code which can be transmitted by said RF transmitter;
   a handheld initiator for sending an initiation signal including a vehicle identification code associated with a particular vehicle to each of said plurality of tire pressure sensors;
   a vehicle control for receiving RF transmissions from said plurality of tire pressure sensors; and
   said RF transmitters on said plurality of tire pressure sensors receiving said initiation signal and generating a combined RF transmission signal including said sensor identification code and said vehicle identification code, said vehicle control being capable of comparing an expected vehicle identification code to a vehicle identification code received from said RF transmitter, and learning said sensor identification code should said expected vehicle identification code match said received vehicle identification code, but ignoring the sensor identification code should said expected vehicle identification code not match said received vehicle identification code.

8. The method as set forth in claim 1, wherein said expected vehicle ID will be different for each of the vehicles being manufactured in a manufacturing facility.

9. The tire pressure monitoring system as set forth in claim 6, wherein said receiver is an LF receiver.

10. The tire pressure monitoring system as set forth in claim 6, wherein the vehicle identification code would be unique for each of a plurality of vehicles being manufactured within a manufacturing facility.

11. The tire pressure monitoring system as set forth in claim 7, wherein each of the vehicle identification codes are unique to a particular vehicle.

* * * * *